(12) United States Patent
Takayanagi et al.

(10) Patent No.: US 6,396,570 B2
(45) Date of Patent: May 28, 2002

(54) DISTANCE MEASUREMENT APPARATUS AND DISTANCE MEASURING METHOD

(75) Inventors: Isao Takayanagi, Kamiina-gun; Taishin Yoshida, Hachioji, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/803,449

(22) Filed: Mar. 9, 2001

(30) Foreign Application Priority Data

Mar. 17, 2000 (JP) ........................................ 2000-077134

(51) Int. Cl.$^7$ ................................................ G01C 3/08
(52) U.S. Cl. ...................................................... 356/5.01
(58) Field of Search ............................... 356/5.01–5.08, 356/3.01–5.15; 342/458, 134–137

(56) References Cited

U.S. PATENT DOCUMENTS

| | | | | |
|---|---|---|---|---|
| 4,574,310 A | * | 3/1986 | Nishizawa et al. | 358/212 |
| 4,761,546 A | * | 8/1988 | Ikari et al. | 250/201 |
| 4,953,972 A | * | 9/1990 | Zuk | 356/4 |
| 5,082,363 A | * | 1/1992 | Nakanishi et al. | 356/1 |
| 5,506,429 A | * | 4/1996 | Tanaka et al. | 257/233 |
| 5,644,385 A | * | 7/1997 | Mizuno | 356/3.04 |
| 6,281,533 B1 | * | 8/2001 | Miyagawa et al. | 257/290 |
| 6,317,200 B1 | * | 11/2001 | Wang et al. | 356/4.07 |

OTHER PUBLICATIONS

Miyagawa et al; "Integration–Time Based Computational Image Sensors"; 1995; IEEE Workshop on Charge–Coupled Devices and Advanced Image Sensors; Apr. 20–22, 1995.

* cited by examiner

Primary Examiner—Thomas H. Tarcza
Assistant Examiner—Brian Andrea
(74) Attorney, Agent, or Firm—Frishauf, Holtz, Goodman, Langer & Chick, P.C.

(57) ABSTRACT

A distance measurement apparatus irradiates an object with a light from a light source whose luminance can be modulated or from a pulse light source, and receives the reflected and returned light to obtain a distance to the object. A photoelectric converter receives the reflected light and photoelectrically converts the received light. A first charge accumulator accumulates an electric charge transferred via a first gate driven by a first transfer pulse synchronized with an emitting timing of the light from the light source among electric charges generated by the photoelectric converter. A second charge accumulator accumulates an electric charge transferred via a second gate driven by a second transfer pulse complementary to the first transfer pulse among the electric charges generated by the photoelectric converter. A normalization circuit reads a first signal based on the accumulated electric charge of the first charge accumulator, and a second signal based on the accumulated electric charge of the second charge accumulator, and normalizes the smaller signal of the first and second signals with an added signal of the first and second signals.

11 Claims, 5 Drawing Sheets

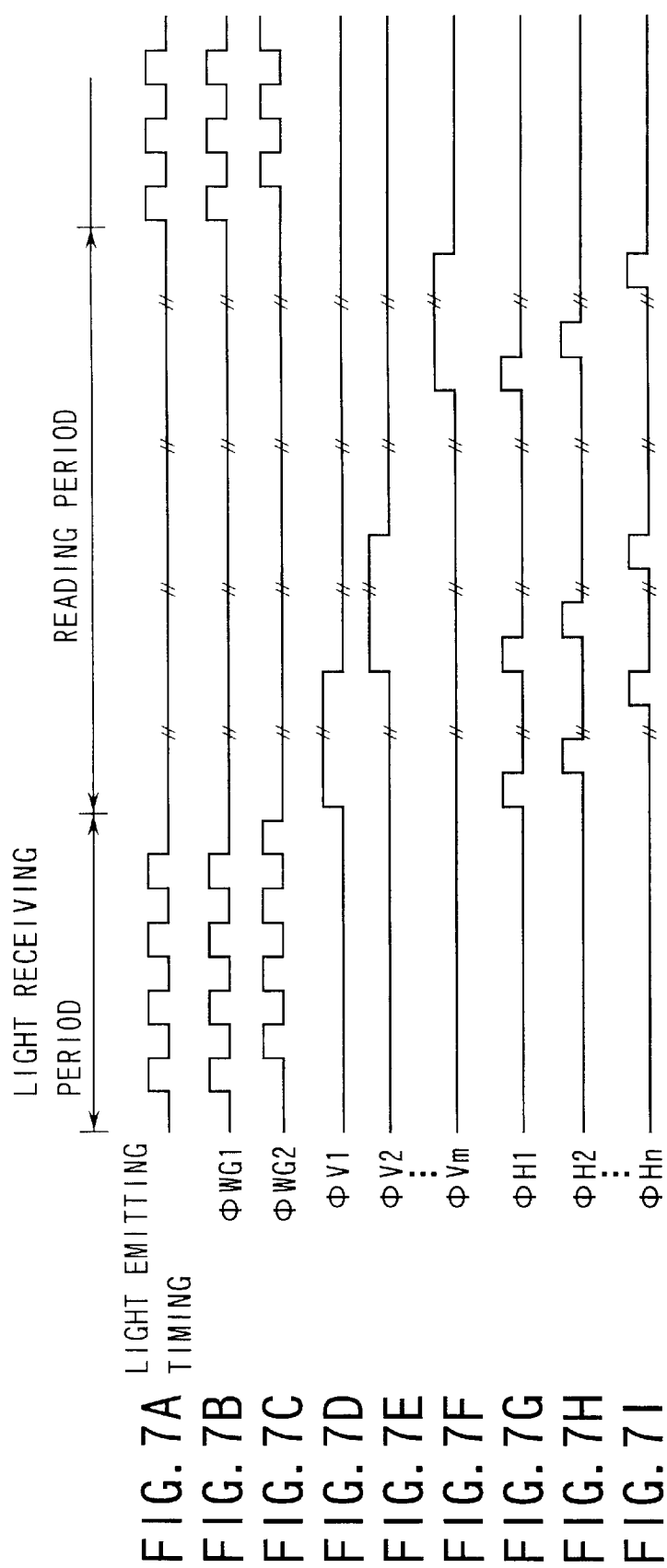

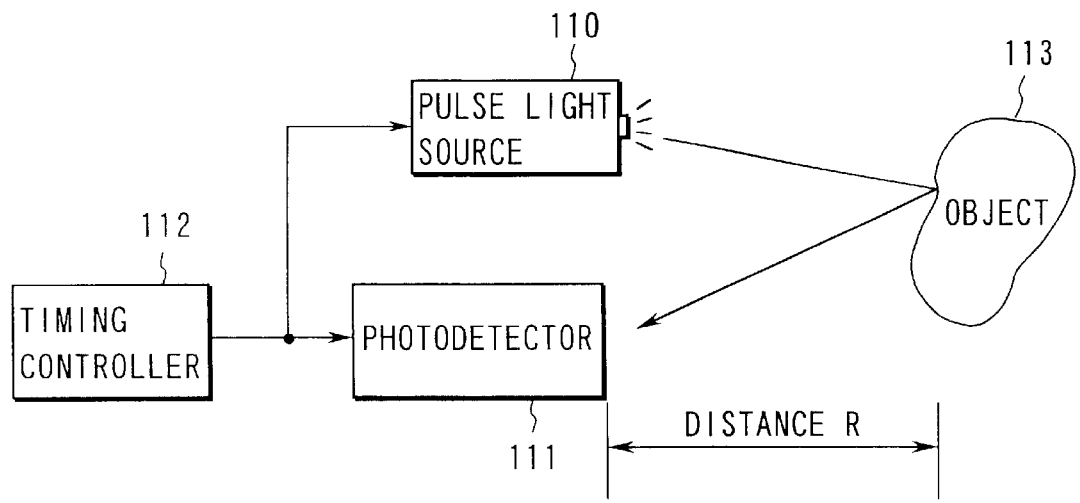
FIG. 9 (PRIOR ART)
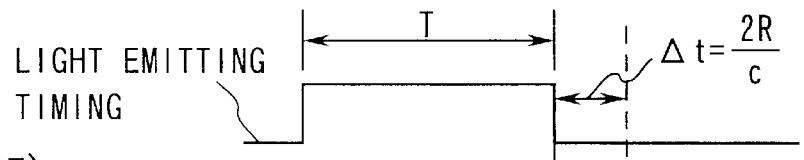
FIG. 10A
(PRIOR ART)
FIG. 10B
(PRIOR ART)
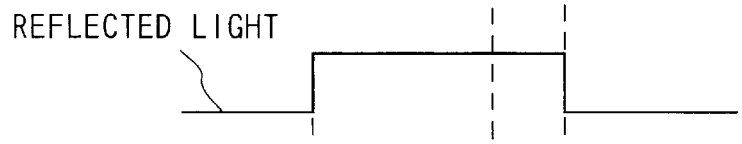
FIG. 10C
(PRIOR ART)
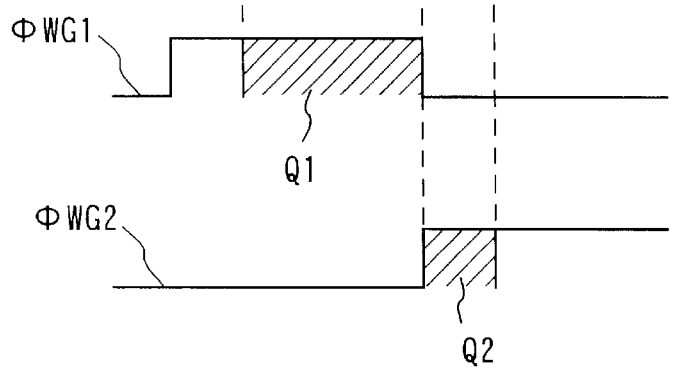
FIG. 10D
(PRIOR ART)

DISTANCE MEASUREMENT APPARATUS AND DISTANCE MEASURING METHOD

CROSS-REFERENCE TO RELATED APPLICATIONS

This application is based upon and claims the benefit of priority from the prior Japanese Patent Application No. 2000-077134, filed Mar. 17, 2000, the entire contents of which are incorporated herein by reference.

BACKGROUND OF THE INVENTION

The present invention relates to a distance measurement apparatus and a distance measuring method. More particularly, it relates to a distance measurement apparatus and a distance measuring method in which a light flight time is detected and a distance from an object is detected, so that precision of distance measurement is enhanced.

Known is a conventional distance measuring technique by a time-of-flight system for detecting a timing of a reflected light which is reflected and returned by an object, detecting a time difference from a light emitting timing, and obtaining a light flight time to detect a distance to the object.

Moreover, another distance measuring method is usually a triangular survey system. As compared with the triangular survey system, in the time-of-flight system, there are advantages that the distance can be detected from one observation point and the apparatus can therefore be miniaturized, and that any occlusion as a problem of triangular survey does not occur and the distances to all object points from the observation point can therefore be detected.

Moreover, there are some methods for measuring a delay of the light reflected by the object. For example, in a method in which a charge distributing detector is utilized as disclosed in "Integration-Time Based Computational Image Sensors", 1995 IEEE Workshop on Charge-Coupled Devices and Advanced Image Sensors, Apr. 20 to 22, 1995, Dana Point, Calif., USA, a distance extraction processing can be simplified. Additionally, since a semiconductor manufacturing technique is used, the method is suitable for miniaturizing the apparatus.

A constitution of the charge distributing detector disclosed in "Integration-Time Based Computational Image Sensors", 1995 IEEE Workshop on Charge-Coupled Devices and Advanced Image Sensors, Apr. 20 to 22, 1995, Dana Point, Calif., USA, and the distance measuring method utilizing the charge distributing detector will next be described.

FIGS. 8A, 8B show a basic constitution of the charge distributing detector and a principle of a charge distributing operation by the detector.

First, the constitution of the charge distributing detector will be described.

That is to say, as shown in FIG. 8A, the charge distributing detector is constituted of an MOS light receiver 101 formed on a P-type semiconductor substrate 100, a first transfer gate 103 disposed in the vicinity of the MOS light receiver 101 and between the MOS light receiver and a first charge accumulation area 102, and a second transfer gate 105 disposed in the vicinity of the MOS light receiver 101 and between the MOS light receiver and a second charge accumulation area 104.

The MOS light receiver 101 is provided with a gate electrode having a good light transmittance, and a voltage is applied to the gate electrode to form a depletion layer on the surface of the P-type semiconductor substrate 100.

On the other hand, an electric potential is applied to the first and second charge accumulation areas 102 and 104 to form a potential well deeper than the semiconductor surface potential of the MOS light receiver 101.

Moreover, transfer pulses ΦWG1 and ΦWG2 can individually be applied to the first and second transfer gates 103 and 105.

A charge distributing operation by the charge distributing detector constituted as described above will next be described.

First, while the second transfer gate 105 is closed, a transfer pulse is applied to ΦWG1 to turn ON the first transfer gate 103. Then, as shown by a solid-state line in FIG. 8B, electrons photo-generated in the MOS light receiver 101 flow into the first charge accumulation area 102 via the first transfer gate 103, and are accumulated as an electric charge Q1 in the first charge accumulation area 102.

Conversely, while the first transfer gate 103 is closed, the transfer pulse is applied to ΦWG2 to turn ON the second transfer gate 105. Then, as shown by a broken line in FIG. 8B, the electron photo-generated in the MOS light receiver 101 flows into the second charge accumulation area 104 via the second transfer gate 105, and is accumulated as an electric charge Q2 in the second charge accumulation area 104.

When the transfer pulses ΦWG1 and ΦWG2 applied to the first and second transfer gates 103 and 105 are alternately turned ON in this manner, it is possible to control a transfer direction of the electron photo-generated in the first and second charge accumulation areas 102 and 104.

The distance measuring principle using the charge distributing detector will next be described with reference to FIGS. 9 and 10A to 10D.

As shown in FIG. 9, a measurement system is constituted of a pulse generating light source 110, charge distributing detector 111 and timing controller 112.

Here, the timing controller 112 establishes synchronization in the pulse generating light source 110 and charge distributing detector 111, and further controls an operation timing.

It is assumed that a distance to the object 113 from the measurement system is R. For convenience of description, it is assumed that the distance to the object 113 from the pulse generating light source 110 is the same as the distance to the object 113 from the charge distributing detector 111.

Moreover, as shown in FIGS. 10A to 10D, first, the object 113 is irradiated with a pulse light with a light emitting time T from the pulse generating light source 110.

The light reflected by the object 113 reciprocates by the distance R, that is, flies by a distance 2R, and is incident upon the charge distributing detector 111 with a delay of Δt=2R/c (here, c indicates light speed) behind the pulse light emitting timing.

In this case, the transfer pulse ΦWG1 is applied to the first transfer gate 103 of the charge distributing detector 111 at the same timing as that of the light emitting pulse, and the transfer pulse ΦWG2 is applied to the second transfer gate 105 at a timing at which the light emitting pulse turns off. During this, the photo-generated electron generated by the reflected light is detected.

Here, it is supposed that there is no cross talk in an electric charge transfer operation and that electric charge transfer is switched at a sufficiently high speed. Then, the electric charge Q1 accumulated in the first charge accumulation area 102 and electric charge Q2 accumulated in the second charge accumulation area 104 are represented by the following equations (1) and (2), respectively.

$$Q1 = -Qt \times (T - \Delta t)/T \quad (1)$$

$$Q2 = -Qt \times \Delta t/T \quad (2)$$

Therefore, the distance R to the object can be obtained by the following equation (3).

$$R = (cT/4) \times \{(Q1-Q2)/(Qt-1)\} \quad (3)$$

As described above, in the distance measuring method in which the charge distributing detector is used as described above, the distance to the object can be measured with a very simple processing. As compared with the distance measuring method which is based on the triangular survey method, the distance to the object can be detected only by observation from one point. Therefore, it is possible to miniaturize the apparatus and to realize a very superior distance measurement apparatus in which no occlusion occurs.

Moreover, the charge distributing detector can be prepared by applying a technique of a charge transfer device (CCD) frequently used in a solid-state image pickup device, and is advantageous for integration of the apparatus.

Additionally, a shot noise by light quantum fluctuation exists in the signal charges Q1 and Q2.

A standard deviation amount of the shot noise is generally a square root of the number of incident photons. However, since the photon having an energy of a visible light area usually generates a single electron-hole pair in a semiconductor, it is unnecessary to consider an amplification fluctuation. Additionally, a process of exciting the electron in the semiconductor is also a quantum effect, and it may be supposed that each electron exciting process has no correlation among electrons. Therefore, the shot noise proportional to the square root of the number of electrons exists in the final signal charges Q1 and Q2.

That is to say, Q1 includes noise $(q \cdot Q1)^{1/2}$ and Q2 includes $(q \cdot Q2)^{1/2}$ (here, q denotes an elementary electric charge).

When the shot noise is considered, and a noise term is considered in the equation (3) by first approximation, the following equation (4) results.

$$R = (cT/4) \times \{\underline{(Q1-Q2)/(Qt)} + [SQR(q/Qt)]\} \quad (4)$$

Here, a first term with parentheses 1 denotes a signal component, and a second term denotes a noise component.

Moreover, Qt=Q1+Q2. An underlined portion denotes an average value, and a value in brackets indicates a standard deviation value of an alternating noise component.

As seen from the second term, the noise of a conventional charge distributing pixel does not depend on charge distributing states of Q1 and Q2, and depends only on a total signal charge amount.

Signal deterioration by the shot noise can be suppressed by securing a sufficient light amount. However, when the apparatus is reduced in size and power consumption, the devices are two-dimensionally arranged, and multiple points are simultaneously measured, there is a practical limitation in the light emitting amount of the pulse generating light source, and it is required to secure precision even with a smaller light amount.

BRIEF SUMMARY OF THE INVENTION

The present invention has been developed in consideration of the aforementioned situations, and an object thereof is to provide a distance measurement apparatus using a charge distributing detector which can obtain a satisfactory distance measurement precision even with a smaller light amount.

Another object of the present invention is to provide a distance measuring method using a charge distributing detector which can suppress signal deterioration by a shot noise and obtain a satisfactory distance measurement precision with a smaller light amount.

To achieve the aforementioned objects, according to one aspect of the present invention, there is provided a distance measurement apparatus for irradiating an object with a light from a light source whose luminance can be modulated or from a pulse light source, and receiving the reflected and returned light to obtain a distance to the object, the distance measurement apparatus comprising:

a photoelectric converter for receiving the reflected light and photoelectrically converting the received light;

a first charge accumulator for accumulating an electric charge transferred via a first gate driven by a first transfer pulse synchronized with an emitting timing of the light from the light source among electric charges generated by the photoelectric converter;

a second charge accumulator for accumulating an electric charge transferred via a second gate driven by a second transfer pulse complementary to the first transfer pulse among the electric charges generated by the photoelectric converter; and a normalization circuit for reading a first signal based on the accumulated electric charge of the first charge accumulator, and a second signal based on the accumulated electric charge of the second charge accumulator, and normalizing the smaller signal of the first signal and the second signal with an added signal of the first signal and the second signal.

Moreover, according to another aspect of the present invention, there is provided a distance measurement apparatus for irradiating an object with a light from a light source whose luminance can be modulated or from a pulse light source, and forming an image of the reflected and returned light on a two-dimensional pixel array by an optical system to obtain a distance to the object for each pixel, the distance measurement apparatus comprising:

a two-dimensional pixel array in which each pixel comprises a photoelectric converter, a first gate for transferring an electric charge generated by the photoelectric converter to a first charge accumulator, and a second gate for transferring the electric charge generated by the photoelectric converter to a second charge accumulator, and control terminals of the first gate and the second gate of each pixel are connected in common;

a line selection circuit for selecting a line of the two-dimensional pixel array;

a line parallel reader for reading a first signal based on the electric charge accumulated in the first charge accumulator and a second signal based on the electric charge accumulated in the second charge accumulator in parallel with respect to the pixel of the line selected by the line selection circuit;

a normalization circuit for normalizing the smaller signal of the first signal and the second signal read by the line parallel reader with an added signal of the first signal and the second signal for each row of the two-dimensional pixel array;

a first transfer pulse applicator for applying a transfer pulse synchronous with an emitting timing of the light from the light source to the first gate; and a second transfer pulse applicator for applying a transfer pulse complementary to the transfer pulse applied to the first gate to the second gate.

Furthermore, according to further aspect of the present invention, there is provided a distance measuring method for irradiating an object with a light from a light source whose luminance can be modulated or from a pulse light source, and receiving the reflected and returned light to obtain a distance to the object, the method comprising the steps of:

receiving the reflected light and photoelectrically converting the received light;

accumulating an electric charge transferred via a first gate driven by a first transfer pulse synchronous with an emitting timing of the light from the light source among electric charges generated by the photoelectric converter in a first charge accumulator;

accumulating an electric charge transferred via a second gate driven by a second transfer pulse complementary to the first transfer pulse among the electric charges generated by the photoelectric converter in a second charge accumulator; and reading a first signal based on the accumulated electric charge of the first charge accumulator, and a second signal based on the accumulated electric charge of the second charge accumulator, and normalizing the smaller signal of the first signal and the second signal with an added signal of the first signal and the second signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 7A to 7I are timing diagrams showing an operation according to the second embodiment of the present invention;

FIG. 9 is a diagram of the basic constitution of the measurement system showing a distance measuring principle using the charge distributing detector of the conventional art; and FIGS. 10A to 10D are diagrams of operation timings showing the distance measuring principle using the charge distributing detector of the conventional art.

DETAILED DESCRIPTION OF THE INVENTION

Figure 1:
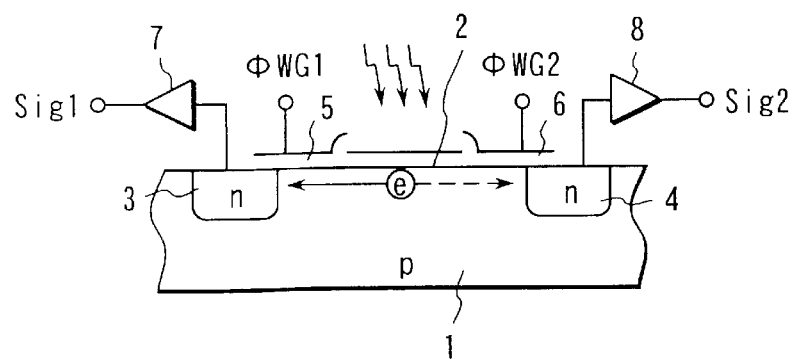
FIG. 1 shows a constitution of a charge distributing detector for use in a distance measurement apparatus according to the present invention.

Reference will now be made in detail to the presently preferred embodiments of the invention as illustrated in the accompanying drawings, in which like reference numerals designate like or corresponding parts.

Preferred embodiments of the present invention will be described hereinafter with reference to the drawings.

(First Embodiment)

FIG. 1 shows a constitution of a charge distributing detector for use in a distance measurement apparatus according to a first embodiment of the present invention.

That is to say, the charge distributing detector for use in the distance measurement apparatus according to the first embodiment is constituted of: a photoelectric conversion area 2 disposed on a semiconductor substrate 1; a first and second transfer gates 5 and 6, connected to the photoelectric conversion area 2, for transferring a photo-generation electron generated in the photoelectric conversion area 2 to first and second charge accumulation areas 3 and 4; a first reading circuit 7 for reading a first signal charge accumulated in the first charge accumulation area 3; and a second reading circuit 8 for reading a second signal charge accumulated in the second charge accumulation area 4.

Additionally, a measurement system constitution, an emitting timing of a pulse generating light source, and transfer pulses ΦWG1 and ΦWG2 applied to the first and second transfer gates 5 and 6 are similar to those of the conventional art shown in FIGS. 9 and 10.

That is to say, it is assumed that the transfer pulse ΦWG1 applied to the first transfer gate 5 is synchronized with the emitting timing of the pulse generating light source, and that the transfer pulse ΦWG2 is applied to the second transfer gate 6 at a timing complementary to that of the transfer pulse ΦWG1 applied to the first transfer gate 5.

Moreover, in the charge distributing detector constituted as described above, similarly as the conventional art, a pulse of time T is emitted from the pulse generating light source, a light reflected by an object present at a distance R is received by the charge distributing detector, an electric charge represented by the equation (1) is thereby accumulated in the first charge accumulation area 3, and further the electric charge represented by the equation (2) is accumulated in the second charge accumulation area 4.

Figure 2:
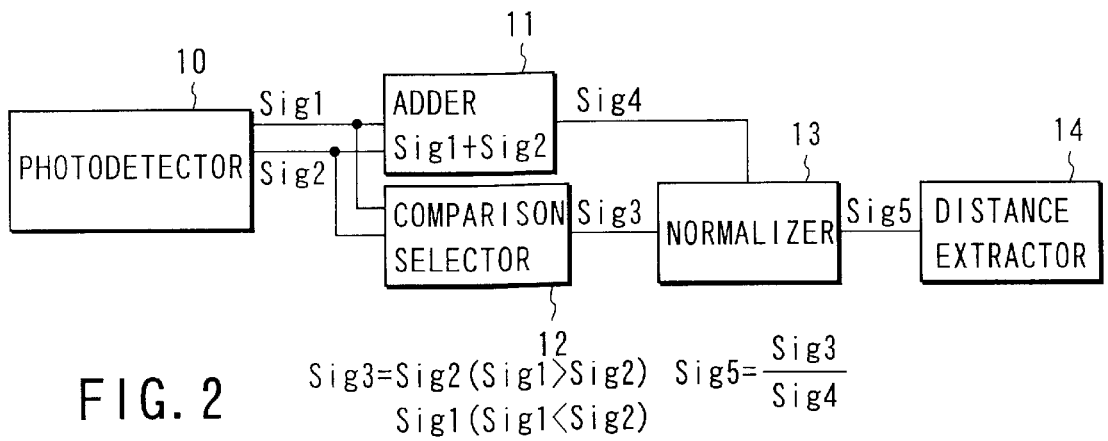
FIG. 2 is a processing system constitution diagram showing a signal processing method according to the present invention.

A signal processing method of the distance measurement apparatus according to the first embodiment of the present invention will next be described with reference to a processing system constitution diagram of FIG. 2.

That is, signals sig1 and sig2 output from a charge distributing detector 10 via the first and second reading circuits 7 and 8 are input to an adder 11 and a comparison selector 12, respectively.

Then, the comparison selector 12 compares a size of the output sig1 from the first reading circuit 7 with that of the output sig2 from the second reading circuit 8, and the smaller signal of these signals is output as sig3.

Moreover, the adder 11 adds the respective outputs sig1 and sig2 via the first and second reading circuits 7 and 8, and outputs an addition result as sig4.

That is, the following equations result.

$$sig3 = sig1(sig1 < sig2) \quad (5)$$

$$= sig2(sig1 > sig2) \quad (5')$$

$$sig4 = sig1 + sig2 \quad (6)$$

Furthermore, the output sig3 of the comparison selector 12 and output sig4 of the adder 11 are input to a normalizer 13. The normalizer divides the output sig3 of the comparison selector 12 by the output sig4 of the adder 11, normalizes the signal, and outputs sig5 as represented by the following equation.

$$sig5 = sig3/sig4 \quad (7)$$

The output sig5 as the signal normalized by the normalizer 13 is fed to a distance extractor 14 and converted to a distance signal.

For convenience of description, it is assumed that the first and second reading circuits 7 and 8 linearly read respective signal charge amounts of the first and second charge accumulation areas 3 and 4 with a sufficient precision.

When the comparison selector 12 selects sig1 and outputs sig3, the distance extractor 14 follows the equations (1), (3). When the comparison selector selects sig2 and outputs sig3, the distance extractor follows the equations (2), (3) to extract the distance R to the object.

Here, the distance extractor 14 performs a distance information extraction processing by simple equation conversion as represented by the following equation.

$$R = (cT/2) \times (1 - sig5)(sig1 < sig2) \quad (8)$$

$$= (cT/2) \times sig5(sig1 > sig2) \quad (8')$$

The constitution and operation of the charge distributing detector for use in the distance measurement apparatus according to the first embodiment of the present invention have been described above. An effect of the charge distributing detector will next be described.

Figure 3A:
FIG. 3A is a diagram showing changes of signal charges Q1 and Q2 with respect to a delay time (Δt) of a reflected light.
Figure 3B:
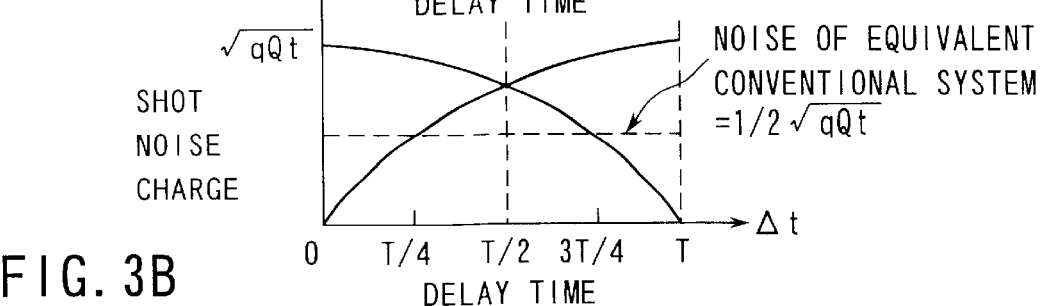
FIG. 3B is a diagram showing changes of shot noise amounts included in the signal charges Q1 and Q2.

FIG. 3A shows changes of signal charges Q1 and Q2 with respect to a delay time (Δt) of the reflected light, and FIG. 3B is shows changes of shot noise amounts included in the signal charges Q1 and Q2.

First, either signal charge Q1 or Q2 linearly changes with respect to Δt as represented by the equations (1) and (2).

Therefore, even when either signal charge Q1 or Q2 is used, the distance can be extracted by normalizing the charge by Qt.

On the other hand, a shot noise is proportional to a square root of the number of electric charges. Therefore, for example, when Δt is smaller than T/2, the shot noise of the signal charge Q2 is smaller. Moreover, when Δt is larger than T/2, conversely the shot noise of the signal charge Q1 is smaller.

Therefore, when the signal charges Q1 is compared with Q2, and the signal charge with a smaller charge amount is used to extract the delay time, that is, the distance, precision can be inhibited from being deteriorated by the shot noise.

Additionally, the shot noise amount by the conventional detecting method will be described. The shot noise amount by the conventional detecting method is represented by a second term within parentheses of the equation (4).

That is, the shot noise in the equation (4) is a square root of the number of electric charges Qt=Q1+Q2.

However, in the processing method of the present invention, the signal is set to Q1−Q2. As compared with the conventional system, the signal amount increases twice, and an influence of the shot noise is halved in an equivalent manner.

That is, when the noise $\frac{1}{2}(q \cdot Qt)^{1/2}$ of the conventional system shown by a broken line in FIG. 3B is compared with a noise value according to the present invention, it is seen that for the noise value of the present invention in areas of Δt=0 to T/4 and Δt=3T/4 to T, the shot noise becomes less than that of the conventional system.

As described above in the first embodiment, according to the present invention, in the distance measurement apparatus using the charge distributing detector, as compared with the conventional system, the shot noise can be suppressed without increasing irradiation amount, and high-precision distance measurement becomes possible.

Particularly, in the conventional system, the noise influence is constant regardless of the distance to the object. On the other hand, in the present invention, a precision remarkably superior to that of the conventional system can be realized with respect to the object in the area having a small Δt, that is, in a short distance.

Additionally, the apparatus may be constituted such that the conventional system is used in the little noise area of Δt=T/4 to 3T/4 to reduce the shot noise of the entire measurement range.

(Second Embodiment)

A second embodiment of the present invention will next be described in detail.

In the present embodiment, a detector is used in which the charge distributing detectors of the first embodiment are two-dimensionally arranged as the pixels, distances to a plurality of measurement points are simultaneously measured, and a distance image can be output. According to the effect of the first embodiment, there is provided a distance measurement apparatus by which distance measurement is possible with high precision.

Figure 4:
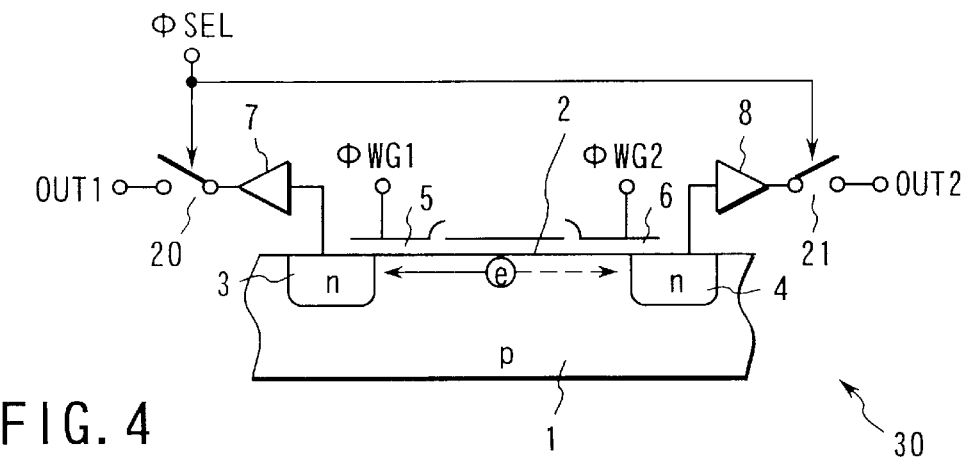
FIG. 4 is a constitution diagram of a unit pixel (charge distributing pixel 30) constituted using a principle of the charge distributing detector according to a second embodiment of the present invention.

FIG. 4 shows a constitution of a unit pixel (charge distributing pixel 30) constituted using the principle of the charge distributing detector for use in the distance measurement apparatus of the first embodiment according to the second embodiment of the present invention.

Additionally, in FIG. 4, portions having the same functions as those of the first embodiment are denoted with the same reference numerals, and description thereof is omitted.

That is, in the charge distributing pixel 30, the output terminal of the first charge reading circuit 7 for reading the signal accumulated in the first charge accumulation area 3 is connected to an output terminal OUT1 via a selection switch 20.

Moreover, the output terminal of the second charge reading circuit 8 for reading the signal accumulated in the second charge accumulation area 4 is connected to an output terminal OUT2 via a selection switch 21.

Here, respective control terminals of the selection switches 20 and 21 are connected in common.

Figure 5:
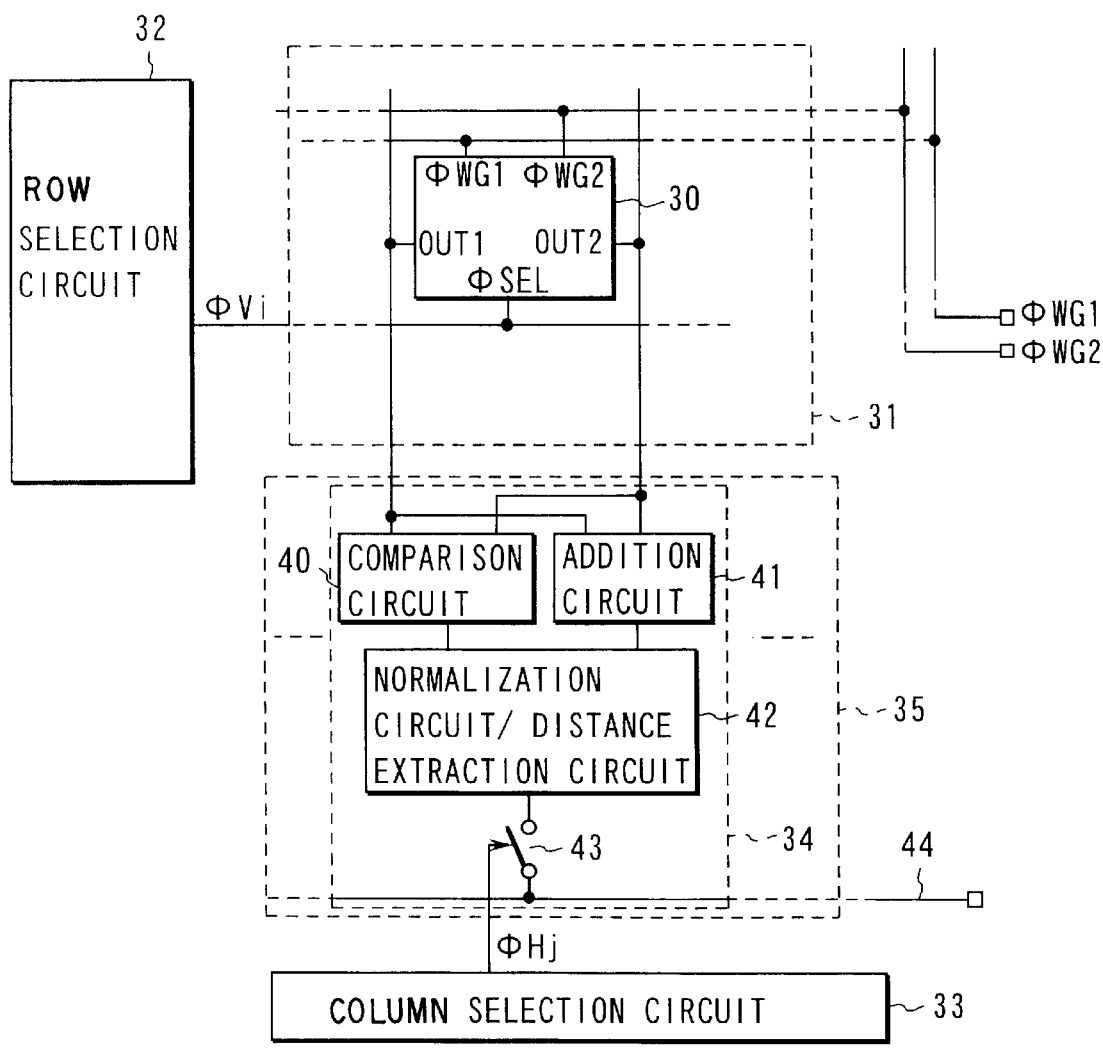
FIG. 5 is a diagram showing the entire constitution of the charge distributing detector according to the second embodiment of the present invention.

The entire constitution of the charge distributing detector according to the second embodiment of the present invention will next be described with reference to FIG. 5.

That is, the charge distributing detector is constituted of: a pixel array 31 constituted by two-dimensionally arranging the charge distributing pixel 30 shown in FIG. 4; a row selection circuit 32 for selecting a line of the pixel array 31; a column selection circuit 33 for selecting an output row of the pixel array 31; and a row parallel processing circuit 35 in which rows of processing circuit units 34 are arranged in parallel.

Moreover, pixel selection terminals ΦSEL of the charge distributing pixels 30 for each line are connected in common to the row selection circuit 32.

Furthermore, the output terminals OUT1 and OUT2 for each row are connected in common to the processing circuit unit 34.

Additionally, the respective control terminals of the first and second charge transfer gates 5 and 6 of all the charge distributing pixels 30 are connected in common.

Moreover, after the signals output via the respective charge distributing pixels 30 are input to a comparison (selection) circuit 40 and addition circuit 41 constituting the processing unit circuit 34 via the output terminals OUT1 and OUT2, the signals are output to a signal output line 44 via a normalization circuit/distance extraction circuit 42 and horizontal selection switch 43.

Here, the control terminal of the horizontal selection switch 43 is connected to the column selection circuit 33.

Moreover, since the comparison (selection) circuit 40, addition circuit 41, and normalization circuit/distance extraction circuit 42 function to perform the same series of processing as that of the first embodiment, the description thereof is omitted.

The distance measurement apparatus using the charge distributing detector of the second embodiment will next be described with reference to FIGS. 6 and 7A to 7I.

Figure 6:
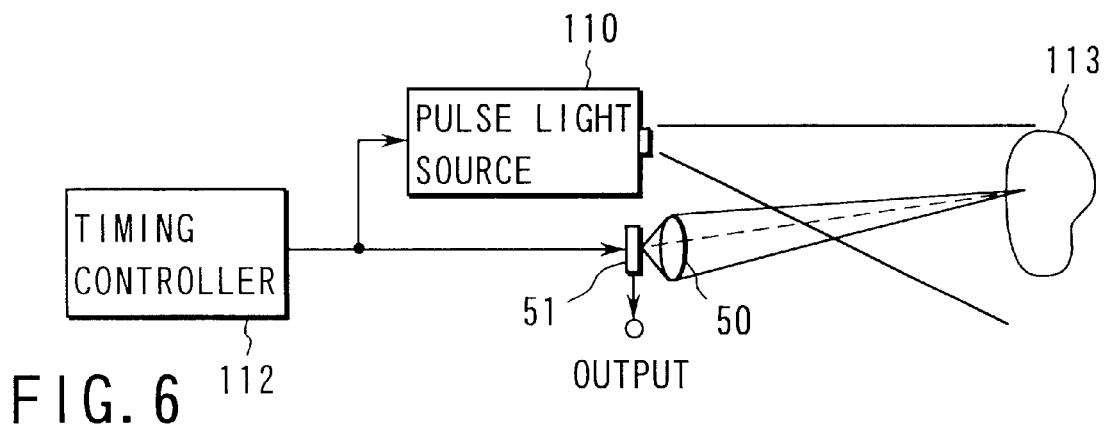
FIG. 6 is a diagram showing the entire constitution of a measurement system according to the second embodiment of the present invention.
Figure 8A:
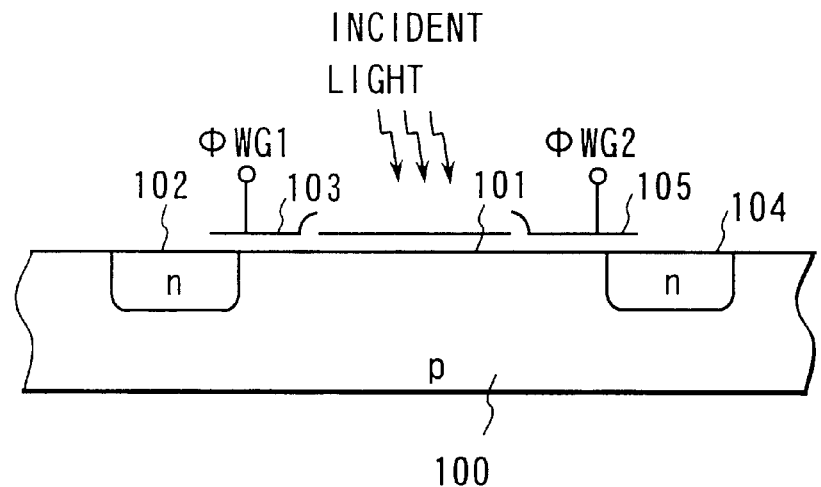
FIGS. 8A and 8B are diagrams showing a basic constitution of a charge distributing detector according to a conventional art and a principle of a charge distributing operation of the detector.
Figure 8B:
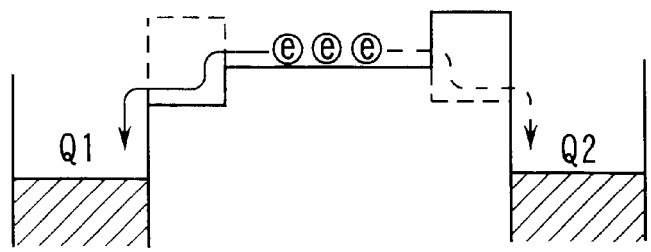

FIG. 6 shows the entire constitution of a measurement system according to the second embodiment of the present invention, and FIGS. 7A to 7I are operation timing diagrams.

First, the measurement system will be described with reference to FIG. 6.

Additionally, in FIG. 6, the portions having the same functions as those of the constituting elements of the conventional art shown in FIG. 9 are denoted with the same reference numerals, and the description thereof is omitted.

That is, an object 113 is irradiated with a light pulse emitted from a pulse light source 110, and the light reflected by the surface of the object 113 is formed into an image on a pixel array of a detector 51 by an optical system 50.

An operation timing will next be described with reference to FIGS. 7A to 7I.

First, during a light receiving period, the pulse light source 110 repeatedly emits a pulse light.

Here, the pulse light is not necessarily a repeated pulse, and may be a single pulse. In the light receiving period, a pulse synchronous with an emitting timing is applied to the first transfer gate 5 as shown by ΦWG1, and a pulse complementary to the first transfer pulse is applied to the second transfer gate 6 as shown by ΦWG2.

Moreover, when the light receiving period ends, the period shifts to a reading period in which the signal accumulated in the charge distributing pixel 30 is read.

First, a first line of selection pulse ΦV1 is output via the row selection circuit 32, the respective signals are output from the charge distributing pixel 30 positioned in the first line of the pixel array 31 via the output terminals OUT1 and OUT2, and the distance to an object point corresponding to each charge distributing pixel 30 is extracted in the processing circuit unit 34 disposed for each row.

Thereafter, when the column selection circuit 33 successively selects and scans the selection switch 43, distance information corresponding to the first line of charge distributing pixel 30 is successively output via the signal output line 44.

Subsequently, when reading of the first line is finished, the row selection circuit 32 outputs a selection pulse ΦV2 of a second line, the respective signals are output from the charge distributing pixel 30 positioned in the second line of the pixel array 31 via the output terminals OUT1 and OUT2, and the distance to the object point corresponding to each charge distributing pixel 30 is extracted in the processing circuit unit 34 disposed for each row.

When this processing is repeated, and the distance information corresponding to all pixel positions is output, the reading period ends, and the light receiving period restarts.

As described above based on the second embodiment, according to the present invention, it is possible to independently detect the delay time of the object reflected light image formed on the pixel array of the photodetector for each pixel, and to simultaneously extract the object three-dimensional information of multiple points. An extraction error by the shot noise is reduced, and a multipoint simultaneous distance measurement apparatus able to measure the distance with high precision as compared with the conventional art, that is, a distance image input apparatus can be realized.

Therefore, as described above, according to the present invention, there can be provided the distance measurement apparatus using the charge distributing detector in which the signal deterioration by the shot noise is suppressed and the satisfactory distance measurement precision can be obtained with less light amount.

Moreover, as described above, according to the present invention, there can be provided the distance measuring method using the charge distributing detector in which the signal deterioration by the shot noise is suppressed and the satisfactory distance measurement precision can be obtained with less light amount.

Additionally, in the distance measurement apparatus according to claim 5 or 10, the signal with less offset components, that is, the signal with less shot noise components of the first and second accumulated signals can selectively be used in distance extraction. A detection error by the shot noise can be reduced, high-precision distance measurement is possible as compared with the conventional art, and an irradiation amount can be reduced.

Moreover, in the distance measurement apparatus according to claim 6 or 11, it is possible to independently detect the delay time of the object reflected light image formed on the pixel array of the photodetector for each pixel, and to simultaneously extract the object three-dimensional information of multiple points. Additionally, the error by the shot noise is reduced, the high-precision distance measurement is possible as compared with the conventional art, and the irradiation amount can be reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A distance measurement apparatus for irradiating an object with a light from a light source whose luminance can be modulated or from a pulse light source, and receiving the reflected and returned light to obtain a distance to said object, said distance measurement apparatus comprising:

a photoelectric converter for receiving said reflected light and photoelectrically converting the received light;

a first charge accumulator for accumulating an electric charge transferred via a first gate driven by a first transfer pulse synchronized with an emitting timing of the light from said light source among electric charges generated by said photoelectric converter;

a second charge accumulator for accumulating an electric charge transferred via a second gate driven by a second transfer pulse complementary to said first transfer pulse among the electric charges generated by said photoelectric converter; and a normalization circuit for reading a first signal based on the accumulated electric charge of said first charge accumulator, and a second signal based on the accumulated electric charge of said second charge accumulator, and normalizing the smaller signal of said first signal and said second signal with an added signal of said first signal and said second signal.

2. A distance measurement apparatus for irradiating an object with a light from a light source whose luminance can be modulated or from a pulse light source, and forming an image of the reflected and returned light on a two-dimensional pixel array by an optical system to obtain a distance to said object for each pixel, said distance measurement apparatus comprising:

a two-dimensional pixel array in which each pixel comprises a photoelectric converter, a first gate for transferring an electric charge generated by said photoelectric converter to a first charge accumulator, and a second gate for transferring the electric charge generated by said photoelectric converter to a second charge accumulator, and control terminals of said first gate and said second gate of each pixel are connected in common;

a line selection circuit for selecting a line of said two-dimensional pixel array;

a line parallel reader for reading a first signal based on the electric charge accumulated in said first charge accumulator and a second signal based on the electric charge accumulated in said second charge accumulator in parallel with respect to the pixel of the line selected by said line selection circuit;

a normalization circuit for normalizing the smaller signal of said first signal and said second signal read by said line parallel reader with an added signal of said first signal and said second signal for each row of said two-dimensional pixel array;

a first transfer pulse applicator for applying a transfer pulse synchronized with an emitting timing of the light from said light source to said first gate; and a second transfer pulse applicator for applying a transfer pulse complementary to the transfer pulse applied to said first gate to said second gate.

3. A method for irradiating an object with a light from a light source whose luminance can be modulated or from a pulse light source, and receiving the reflected and returned light to obtain a distance to said object, said method comprising the steps of:

receiving said reflected light and photoelectrically converting the received light;

accumulating an electric charge transferred via a first gate driven by a first transfer pulse synchronized with an emitting timing of the light from said light source among electric charges generated by said photoelectric converter in a first charge accumulator;

accumulating an electric charge transferred via a second gate driven by a second transfer pulse complementary to said first transfer pulse among the electric charges generated by said photoelectric converter in a second charge accumulator; and reading a first signal based on the accumulated electric charge of said first charge accumulator, and a second signal based on the accumulated electric charge of said second charge accumulator, and normalizing the smaller signal of said first signal and said second signal with an added signal of said first signal and said second signal.

4. A distance measurement apparatus for irradiating an object with a light from a light source whose luminance can be modulated or from a pulse light source, and receiving the reflected and returned light to obtain a distance to said object, said distance measurement apparatus comprising:

a photoelectric converter for photoelectrically converting said reflected light;

a first charge accumulator for accumulating an electric charge generated by said photoelectric converter;

a first gate for transferring the electric charge to said first charge accumulator via said photoelectric converter;

a first transfer pulse applicator for applying a pulse synchronized with an emitting timing of the light from said light source to said first gate;

a first reader for reading the electric charge accumulated in said first charge accumulator;

a second charge accumulator for accumulating the electric charge generated by said photoelectric converter;

a second gate for transferring the electric charge to said second charge accumulator via said photoelectric converter;

a second transfer pulse applicator for applying a pulse complementary to the pulse applied by said first transfer pulse applicator to said second gate;

a second reader for reading the electric charge accumulated in said second charge accumulator;

an addition circuit for adding an output from said first reader and an output from said second reader;

a selector for comparing the output from said first reader with the output from said second reader to select a smaller output;

a normalization circuit for normalizing the output selected by said selector with the output of said addition circuit; and a distance measurement section for obtaining the distance to said object from the output of said normalization circuit.

5. A distance measurement apparatus for irradiating an object with a light from a light source whose luminance can be modulated or a pulse light source, detecting the reflected light from the object by a photodetector, and detecting a delay time of the reflected light from an emitting timing of said irradiation light to extract a distance to the object, said distance measurement apparatus comprising:

a photodetector comprising a photoelectric converter, formed on a semiconductor substrate, for converting said reflected light to an electric charge, a first transfer gate for transferring the electric charge photoelectrically converted by said photoelectric converter to a first charge accumulator, a second transfer gate for transferring the electric charge photoelectrically converted by said photoelectric converter to a second charge accumulator, and accumulated signal reader for reading a first accumulated signal accumulated in said first charge accumulator and a second accumulated signal accumulated in the second charge accumulator;

a first transfer pulse applicator for applying a transfer pulse synchronized with an emitting timing of the light from said light source to the first transfer gate of said photodetector;

a second transfer pulse applicator for applying a transfer pulse complementary to the transfer pulse applied to said first transfer gate to said second transfer gate;

an addition circuit for adding said first accumulated signal and said second accumulated signal read by said accumulated signal reader;

a comparison selector for comparing a size of said first accumulated signal with the size of the second accumulated signal read by said accumulated signal reader to select a signal with a smaller signal amount from said first accumulated signal and the second accumulated signal;

a normalization circuit for normalizing the signal selected by said comparison selector with the added signal obtained by said addition circuit; and a delay time extractor for extracting the delay time of said reflected light from the normalized signal obtained by said normalization circuit.

6. A distance measurement apparatus for irradiating an object with a light from a light source whose luminance can be modulated or a pulse light source, forming an image of the reflected light from the object on a photodetector by an optical system, and detecting a delay time of the reflected light from an emitting timing of said irradiation light to extract a distance to the object, said distance measurement apparatus comprising:

a pixel array in which each pixel comprises a photoelectric converter, formed on a semiconductor substrate, for converting said reflected light to an electric charge, a first gate for transferring the electric charge photoelectrically converted by said photoelectric converter to a first charge accumulator, a second gate for transferring the electric charge photoelectrically converted by said photoelectric converter to a second charge accumulator, and an accumulated signal reader for reading accumulated signals accumulated in said first charge accumulator and the second charge accumulator, and the respective pixels are arranged in a two-dimensional array;

a line selection circuit for selecting a line of said pixel array; and a photodetector comprising a line parallel reader for reading a first accumulated signal and a second accumulated signal accumulated in said first charge accumulator and the second charge accumulator of the pixel positioned in the line selected by said line selection circuit in parallel, an addition circuit, disposed in parallel for each row of said pixel array, for adding the first accumulated signal and the second accumulated signal read by said line parallel reader, a comparison selector, disposed in parallel for each row of said pixel array, for comparing the read first accumulated signal with the read second accumulated signal, and selecting the smaller accumulated signal from the first accumulated signal and the second accumulated signal, and a normalization circuit for normalizing the signal selected by said comparison selector with the signal added by said addition circuit, wherein said pixel array is connected in common to control terminals of said first transfer gate and the second transfer gate, and said pixel array comprises a first transfer pulse applicator for applying a transfer pulse synchronized with an emitting timing of the light from said light source to said first transfer gate and a second transfer pulse applicator for applying a transfer pulse complementary to the transfer pulse applied to said first transfer gate to said second transfer gate.

7. A distance measurement apparatus for irradiating an object with a light from a light source whose luminance can be modulated or from a pulse light source, and receiving the reflected and returned light to obtain a distance to said object, said distance measurement apparatus comprising:

a photoelectric converter for photoelectrically converting said reflected light;

a first charge accumulator for accumulating an electric charge transferred via a first gate driven by a first transfer pulse synchronized with an emitting timing of the light from said light source among electric charges generated by said photoelectric converter;

a second charge accumulator for accumulating an electric charge transferred via a second gate driven by a second transfer pulse complementary to said first transfer pulse among the electric charges generated by said photoelectric converter; and means for reading a first signal based on the accumulated electric charge of said first charge accumulator, and a second signal based on the accumulated electric charge of said second charge accumulator, and normalizing the smaller signal of said first signal and said second signal with an added signal of said first signal and said second signal.

8. A distance measurement apparatus for irradiating an object with a light from a light source whose luminance can be modulated or from a pulse light source, and forming an image of the reflected and returned light on a two-dimensional pixel array by an optical system to obtain a distance to said object for each pixel, said distance measurement apparatus comprising:

a two-dimensional pixel array in which each pixel comprises a photoelectric converter, a first gate for transferring an electric charge generated by said photoelectric converter to a first charge accumulator, and a second gate for transferring the electric charge generated by said photoelectric converter to a second charge accumulator, and control terminals of said first gate and said second gate of each pixel are connected in common;

a line selection circuit for selecting a line of said two-dimensional pixel array;

line parallel reading means for reading a first signal based on the electric charge accumulated in said first charge accumulator and a second signal based on the electric charge accumulated in said second charge accumulator in parallel with respect to the pixel of the line selected by said line selection circuit;

means for normalizing the smaller signal of said first signal and said second signal read by said line parallel reading means with an added signal of said first signal and said second signal for each row of said two-dimensional pixel array;

means for applying a transfer pulse synchronized with an emitting timing of the light from said light source to said first gate; and means for applying a transfer pulse complementary to the transfer pulse applied to said first gate to said second gate.

9. A distance measurement apparatus for irradiating an object with a light from a light source whose luminance can be modulated or from a pulse light source, and receiving the reflected and returned light to obtain a distance to said object, said distance measurement apparatus comprising:

a photoelectric converter for photoelectrically converting said reflected light;

a first charge accumulator for accumulating an electric charge generated by said photoelectric converter;

a first gate for transferring the electric charge to said first charge accumulator via said photoelectric converter;

first transfer pulse applying means for applying a pulse synchronized with an emitting timing of the light from said light source to said first gate;

first reading means for reading the electric charge accumulated in said first charge accumulator;

a second charge accumulator for accumulating the electric charge generated by said photoelectric converter;

a second gate for transferring the electric charge to said second charge accumulator via said photoelectric converter;

second transfer pulse applying means for applying a pulse complementary to the pulse applied by said first transfer pulse applying means to said second gate;

second reading means for reading the electric charge accumulated in said second charge accumulator;

addition means for adding an output from said first reading means and an output from said second reading means;

selection means for comparing the output from said first reading means with the output from said second reading means to select a smaller output;

normalization means for normalizing the output selected by said selection means with the output of said addition means; and means for obtaining the distance to said object from the output of said normalization means.

10. A distance measurement apparatus for irradiating an object with a light from a light source whose luminance can be modulated or a pulse light source, detecting the reflected light from the object by a photodetector, and detecting a delay time of the reflected light from an emitting timing of said irradiation light to extract a distance to the object, said distance measurement apparatus comprising:

a photodetector comprising a photoelectric converter, formed on a semiconductor substrate, for converting said reflected light to an electric charge, a first transfer gate for transferring the electric charge photoelectrically converted by said photoelectric converter to a first charge accumulator, a second transfer gate for transferring the electric charge photoelectrically converted by said photoelectric converter to a second charge accumulator, and reading means for reading a first accumulated signal and a second accumulated signal accumulated in said first charge accumulator and the second charge accumulator;

means for applying a transfer pulse synchronized with an emitting timing of the light from said light source to the first transfer gate of said photodetector;

means for applying a transfer pulse complementary to the transfer pulse applied to said first transfer gate to said second transfer gate;

addition means for adding said first accumulated signal and said second accumulated signal read by said reading means;

comparison selection means for comparing a size of said first accumulated signal with the size of the second accumulated signal read by said reading means to select a signal with a smaller signal amount from said first accumulated signal and the second accumulated signal;

normalization means for normalizing the signal selected by said comparison selection means with the added signal obtained by said addition means; and delay time extraction means for extracting the delay time of said reflected light from the normalized signal obtained by said normalization means.

11. A distance measurement apparatus for irradiating an object with a light from a light source whose luminance can be modulated or a pulse light source, forming an image of the reflected light from the object on a photodetector by an optical system, and detecting a delay time of the reflected light from an emitting timing of said irradiation light to extract a distance to the object, said distance measurement apparatus comprising:

a pixel array in which each pixel comprises a photoelectric converter, formed on a semiconductor substrate, for converting said reflected light to an Ad electric charge, a first transfer gate for transferring the electric charge photoelectrically converted by said photoelectric converter to a first charge accumulator, a second transfer gate for transferring the electric charge photoelectrically converted by said photoelectric converter to a second charge accumulator, and reading means for reading accumulated signals accumulated in said first charge accumulator and the second charge accumulator, and the respective pixels are arranged in a two-dimensional array;

a line selection circuit for selecting a line of said pixel array; and a photodetector comprising line parallel reading means for reading a first accumulated signal and a second accumulated signal accumulated in said first charge accumulator and the second charge accumulator of the pixel positioned in the line selected by said line selection circuit in parallel, addition means, disposed in parallel for each row of said pixel array, for adding the first accumulated signal and the second accumulated signal read by the reading means, comparison selection means, disposed in parallel for each row of said pixel array, for comparing the first accumulated signal with the second accumulated signal read by said line parallel reading means, and selecting the smaller accumulated signal from the first accumulated signal and the second accumulated signal, and normalization means for normalizing the signal selected by said comparison selection means with the signal added by said addition means, wherein said pixel array is connected in common to control terminals of said first transfer gate and the second transfer gate, and said pixel array comprises means for applying a transfer pulse synchronized with an emitting timing of the light from said light source to said first transfer gate and means for applying a transfer pulse complementary to the transfer pulse applied to said first transfer gate to said second transfer gate.

* * * * *